Figure 1:
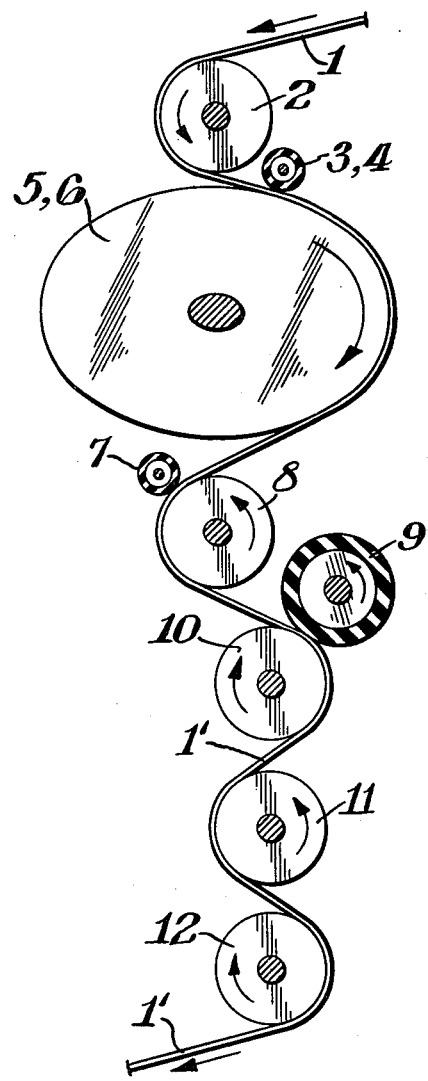

United States Patent [19]

Andersen et al.

[11] 4,379,774

[45] Apr. 12, 1983

[54] PROCESS FOR THE PRODUCTION OF BIAXIALLY STRETCHED AND EMBOSSED FILM COMPOSED OF VINYL CHLORIDE POLYMERS

[75] Inventors: Heinz-Erhardt Andersen, Burgkirchen, Fed. Rep. of Germany; Jaek J. Brebels, Bocholt, Belgium; Klaus Matschke; Franz Scheier, both of Burgkirchen, Fed. Rep. of Germany

[73] Assignee: Hoechst Aktiengesellschaft, Fed. Rep. of Germany

[21] Appl. No.: 303,775

[22] Filed: Sep. 21, 1981

[30] Foreign Application Priority Data

Sep. 26, 1980 [DE] Fed. Rep. of Germany ....... 3036289

[51] Int. Cl.³ .............................................. B29C 17/02
[52] U.S. Cl. ................... 264/284; 264/290.2
[58] Field of Search ................... 264/284, 288.4, 290.2

[56] References Cited

U.S. PATENT DOCUMENTS

| | | | |
|---|---|---|---|
| T927,010 | 10/1974 | Witfield et al. | 264/284 |
| 3,060,515 | 10/1962 | Corbett | 264/284 |
| 3,621,085 | 11/1971 | Ichikawa | 264/290.2 |
| 3,842,152 | 10/1974 | Witfield, Jr. et al. | 264/284 |
| 3,950,480 | 4/1976 | Adams et al. | 264/284 |
| 4,259,285 | 3/1981 | Baumgartl | 264/284 |

FOREIGN PATENT DOCUMENTS 883396 11/1961 United Kingdom ................ 264/284

*Primary Examiner*—James B. Lowe
*Attorney, Agent, or Firm*—Connolly and Hutz

[57] ABSTRACT

A process is described for the production of biaxially stretched and embossed polyvinyl chloride film, in which a polyvinyl chloride film is first stretched biaxially at specific stretching ratios and, immediately after being stretched, is embossed under specific conditions. The film produced by this process is employed with particular advantage as base film for adhesive tapes.

5 Claims, 2 Drawing Figures

U.S. Patent

Apr. 12, 1983

4,379,774

PROCESS FOR THE PRODUCTION OF BIAXIALLY STRETCHED AND EMBOSSED FILM COMPOSED OF VINYL CHLORIDE POLYMERS

The invention relates to a process for the production of biaxially stretched and embossed polyvinyl chloride film.

Biaxially stretched polyvinyl chloride film is described in German Auslegeschrift No. 1,594,129. It is used as base film for the preparation of adhesive tapes. The effect of the biaxial stretching is to impart to the base film those properties which are desirable in view of its use for the production of adhesive tapes. The finished adhesive tape comprises the base film and a layer of adhesive which is applied to one side of the film and which is composed of an adhesion promoter and the actual adhesive. The object of the adhesion promoter is to anchor the adhesive on the base film in such a way that the adhesive is not transferred to the other, non-coated surface of the base film when the adhesive tape is unrolled. When the adhesive tape is unrolled, however, there is a risk that it will tear, particularly if the adhesion between the layer containing the adhesive and the non-coated surface of the base film is very great.

In order to overcome this disadvantage, it is possible, as is known, to apply a release coating to the adhesive-free surface of the base film, as a result of which the force required to unroll the rolled up adhesive tape is reduced. However, these adhesive tapes suffer from the disadvantage that they cannot be printed on the adhesive-free layer. In addition, when rolls of these adhesive tapes are unrolled, a considerable noise of unrolling is produced.

German Utility Model 7,931,547 discloses an adhesive tape comprising a base film made of polyvinyl chloride film and a layer containing adhesive, the polyvinyl chloride film being embossed. The effect of embossing the base film is to make it possible to dispense with the release coat.

The object of the present invention is, therefore, to provide a process for the production of film made from vinyl chloride polymers which has been both biaxially stretched and embossed. The film should, in particular, be suitable for use as base film for the preparation of adhesive tapes.

The process according to the invention for the production of biaxially stretched and embossed polyvinyl chloride film comprises (a) biaxially stretching a polyvinyl chloride film at a temperature of 90° to 160° C. at a transverse stretching ratio of 1.2:1 to 2.2:1 and a longitudinal stretching ratio of 1.7:1 to 2.5:1, the product of the transverse and longitudinal stretching ratios not exceeding 3.8:1, and (b) immediately after stretching, embossing the film by means of an embossing unit comprising an embossing roller and a back-up cylinder, the film having a temperature of 90° to 160° C. and the embossing roller having a temperature of −10° to +60° C. and the embossing pattern of the embossing roller being embossed into the film to a depth of embossing of 0.02 to 0.25 mm.

It was surprising that it is possible to combine the two process stages, namely the biaxial stretching of a polyvinyl chloride film and the subsequent embossing of the stretched film. It would rather have been expected that embossing the previously stretched film would have a disadvantageous effect on the properties of the finished film, for example because holes would occur in the stretched film as a result of the high thermal and mechanical stress during embossing. Surprisingly, the process according to the invention does not suffer from these disadvantages. On the contrary, the combination, according to the invention, of transverse and longitudinal stretching and embossing enables the pattern of properties required in adhesive tape base film to be achieved and, in addition, makes it unnecessary to apply the release coat mentioned above.

The polyvinyl chloride film which is used as the starting material in the process according to the invention is, as a rule, a film produced by calendering or extrusion. Its thickness is generally 0.04 to 0.18 mm, preferably 0.06 to 0.13 mm. As a rule, calendering is carried out by the low temperature process (Luvitherm process), that is to say at a calendering temperature of 150° to 190° C., or by the high temperature process, that is to say at a calendering temperature of 180° to 230° C. Rigid polyvinyl chloride films are preferred.

Vinyl chloride polymers or polyvinyl chloride are to be understood as meaning not only homopolymers of vinyl chloride, but also copolymers, such as copolymers and graft polymers of vinyl chloride which have been prepared by the known continuous or batch polymerisation processes, for example by the emulsion, suspension and mass polymerisation processes. The content of polymerised vinyl chloride in the vinyl chloride copolymers and graft polymers is generally at least 50% by weight, preferably at least 85% by weight, relative to the polymer. The following monomers, for example, are suitable for copolymerisation with vinyl chloride: olefines, such as ethylene and propylene; vinyl esters of carboxylic acids, such as vinyl acetate and vinyl propionate; acrylonitrile; styrene; and cyclohexylmaleinimide.

For the graft polymerisation it is possible to use, for example, elastomeric polymers formed from butadiene, ethylene, propylene, styrene and/or acrylonitrile.

Preferred polyvinyl chlorides are homopolymers of vinyl chloride and its copolymers and graft polymers containing at least 85% by weight of polymerised vinyl chloride. The K values (DIN 53,726) of the polyvinyl chlorides are appropriately 50 to 80, preferably 55 to 78.

The polyvinyl chlorides from which the polyvinyl chloride film is produced generally contain the customary auxiliaries which are advantageous for processing vinyl chloride polymers, preferably heat stabilizers, lubricants and modifying agents for improved impact strength. They can also contain, in addition, special additives, for example substances having an antistatic action. The heat stabilizers employed are preferably organotin sulfur compounds, urea and thiourea derivatives and salts of the alkali metals and also of zinc with aliphatic carboxylic acids or hydroxy carboxylic acids, if appropriate together with co-stabilizers, such as epoxidised soya bean oil and phosphites. Organotin sulfur compounds, such as dimethyltin bis-2-ethylhexylthioglycolate, di-n-butyltin bis-2-ethylhexylthioglycolate and di-n-octyltin bis-2-ethylhexylthioglycolate, are preferred. In general, the quantity of stabilizers is 0.5 to 3.0% by weight, preferably 0.7 to 2.0% by weight, relative to the polyvinyl chloride. The lubricants employed are preferably 1,3-butanediol montanic acid ester which has been limed in such a way that about 40% by weight of the montanic acid employed in the liming is present as the calcium salt (OP wax), 1,3-butanediol montanic acid ester (E wax), bis-stearylethylenediamine (C wax), stearic acid and/or fatty acid esters of glycerol. In general, the quantity of lubricant is 0.5 to 3.0% by weight, preferably 0.5 to 2.0% by weight, relative to the polyvinyl chloride. The modifying agents used for improved impact strength are preferably acrylonitrile-butadiene-styrene (ABS) resins, methyl methacrylate-acrylonitrile-butadiene-styrene (MABS) resins, methyl methacrylate-butadiene-styrene (MBS) resins, polymethyl methacrylate, copolymers of ethylene and vinyl acetate and/or chlorinated polyethylene. The quantity of modifying agent for improved impact strength is generally 5 to 20% by weight, preferably 8 to 15% by weight, relative to the polyvinyl chloride.

The biaxial stretching of the polyvinyl chloride film (stage a) of the process according to the invention) is preferably carried out at a temperature of 110° to 140° C. using a transverse stretching ratio of 1.3:1 to 1.8:1 and a longitudinal stretching ratio of 1.9:1 to 2.3:1, the product of the transverse and longitudinal stretching ratios (this is the area stretching ratio) not exceeding 3.5:1.

The biaxial stretching can be carried out simultaneously or successively. It is preferably carried out successively, specifically by (a$_1$) stretching the polyvinyl chloride film transversely at a ratio of 1.2:1 to 2.2:1, preferably 1.3:1 to 1.8:1, at a temperature of 90° to 160° C., preferably 110° to 140° C., and (a$_2$) after the transverse stretching, stretching the polyvinyl chloride film longitudinally at a ratio of 1.7:1 to 2.5:1, preferably 1.9:1 to 2.3:1, at a temperature of 90° to 160° C., preferably 110° to 140° C., and in so doing (a$_3$) not exceeding a value of 3.8:1, preferably 3.5:1, for the product of the transverse and longitudinal stretching ratios.

With a view to the use of the film produced in accordance with the invention as base film for adhesive tapes, an area stretching ratio of at least 2.0:1, preferably at least 2.5:1, should be achieved.

The polyvinyl chloride film can be stretched on the known devices for stretching thermoplastics. Such devices are described in detail, for example in the German Auslegeschrift No. 1,594,129 mentioned initially, in German Pat. specification No. 1,504,242, in French Pat. specification No. 2,007,313 and in German Pat. specification No. 2,024,308.

The transverse stretching of the polyvinyl chloride film is preferably carried out by means of the device described in German Pat. specification No. 2,024,308. According to this specification, the polyvinyl chloride film which has been heated to the stretching temperature indicated is passed over the wheels inclined at an angle to the direction of travel of the film, and is pressed onto these wheels in a frictional manner. The inclination of the wheels in this operation is such that the transverse stretching ratios indicated are achieved. The heating of the film, which, for example, is taken off a wound roll or comes from a calender or extruder, to the stretching temperature is preferably effected by passing the film over appropriately heated rollers located before the wheels. It can also be effected with the aid of customary infrared radiation equipment. It is advantageous to pass the polyvinyl chloride film coming from the calender or extruder to the transverse stretching process, since this makes re-heating of the film unnecessary. The transverse stretching temperature can be adjusted accurately by passing the film, if appropriate, over one or more appropriately heated or cooled rollers, before it runs onto the inclined wheels.

The longitudinal stretching of polyvinyl chloride film is preferably carried out by passing the film which leaves the wheels over a customary roller unit. Such roller arrangements for the longitudinal stretching of thermoplastics are described in detail in the French Pat. specification already mentioned, No. 2,007,313. The running speed of the longitudinal stretching roller is so adjusted, in relation to the running speed of the film before this roller, that the film is stretched longitudinally in the ratio indicated.

Immediately after the polyvinyl chloride film has been stretched (transverse and longitudinal stretching), it is embossed in accordance with the invention. In this context, immediately means that the film does not suffer any appreciable cooling on the way between being stretched and being embossed, but retains the stretching temperature, preferably the longitudinal stretching temperature. This is preferably achieved by stretching the film longitudinally by means of the embossing unit itself, consisting of the embossing roller and the back-up cylinder.

The embossing (deep-drawing) of the stretched polyvinyl chloride film is effected using the known devices for embossing thermoplastics. Such devices are described, for example, in German Offenlegungsschrift No. 2,833,982.

The embossing roller has a linear, dashed, dimpled or point-like pattern, preferably a lozenge-shaped pattern, a fine linen pattern, a shirting pattern, a pattern composed of longitudinal grooves closely adjacent to one another or patterns of this type superimposed on one another (mixed patterns). In accordance with the invention, the depth (depth of embossing) of the patterns of the embossing roller is 0.02 to 0.25 mm, preferably 0.05 to 0.18 mm.

The temperature of the film when it is being embossed is preferably 110° to 140° C. The film thus preferably comes on to the embossing roller at the temperature which it had during the preceding longitudinal stretching operation. The temperature of the embossing roller is preferably 5° to 30° C. This temperature is appropriately adjusted by means of a liquid, for example water or a coolant, which is passed through the roller at the appropriate temperature.

The temperature of the back-up cylinder, which preferably comprises a rubber roller, is between the temperature of the film and room temperature. This is because the back-up cylinder necessarily takes up such a temperature, since it is neither cooled nor heated.

The embossing pressure (linear pressure in the embossing nip) in the process according to the invention is, as a rule, 10 to 200 Newtons per centimeter of film (N/cm), preferably 50 to 90 N/cm. The speed of the film on the embossing roller (speed of the embossing roller) is, as a rule, 50 to 300 m/min, preferably 100 to 150 m/min.

After leaving the embossing roller, the film is cooled further, preferably by passing it over one or more cooling rollers, and is then wound up.

The film which has been stretched and embossed in accordance with the invention has an average material thickness of, in general, 0.02 to 0.05 mm, preferably 0.025 to 0.035 mm. The total thickness of the film (that is its material thickness including embossing) is, in general, 0.025 to 0.15 mm, preferably 0.035 to 0.085 mm. The depth of the embossed pattern resulting from this is 0.005 to 0.10 mm, preferably 0.01 to 0.05 mm.

The process, according to the invention, for biaxially stretching and embossing polyvinyl chloride film has a number of advantages. It is simple and can also be carried out at high film speeds. Where the film produced in accordance with the invention is used as a base film for adhesive tapes, it is no longer necessary to apply a release coat. The film which has been coated with adhesives can be unrolled very easily. No appreciable noise is produced when it is unwound from the roll. Nor are cracks formed when it is cut into adhesive tapes of desired dimensions, as is the case with an unembossed rigid polyvinyl chloride film provided with a release coat. Because the embossing is carried out immediately after stretching, preferably after longitudinal stretching, the film suffers only a slight loss in width, caused by the longitudinal stretching process (that is to say no additional loss caused by the embossing process). The film produced in accordance with the invention can be printed easily. When this film passes over rollers, it acquires an electrostatic charge appreciably more slowly than is the case with an unembossed film. The feature which particularly distinguishes the film according to the invention is the fact that, inspite of being embossed after stretching, the film has the relatively high values of mechanical strength which are desirable for base film for the production of adhesive tapes, surprisingly distinctly improved values of tensile impact strength in the transverse direction of the film are obtained, which, for example in the case of the film embossed with the fine linen pattern, are even 50% higher than in the case of the unembossed film, and that the pattern embossed into the film and its depth are retained even if the stretched and embossed film is warmed to temperatures of up to about 80° C.

The invention will now be illustrated in greater detail by means of examples and with the aid of a drawing.

Figure 2:
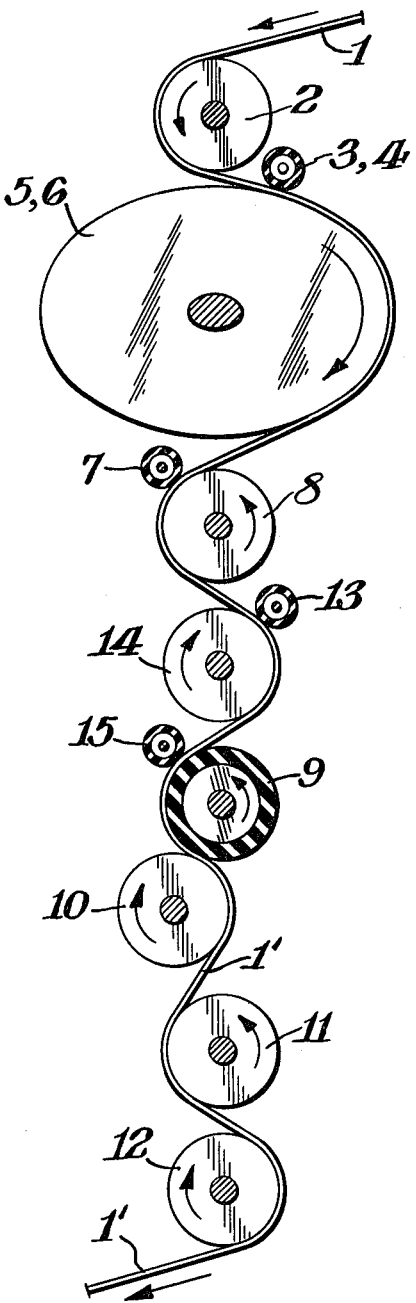

FIG. 1 and FIG. 2 show two devices which can be used preferentially for carrying out the process according to the invention.

EXAMPLE 1

The starting material used is a rigid PVC film, produced by the high temperature calendering process from a suspension homopolymer having a K-value of 55, which is stabilized with a customary organotin stabilizer and contains a lubricant which is customary for calendering (OP wax). The film has a thickness of 0.095 mm.

Summary of process conditions:
Temperature of the film during transverse stretching: 135° C.
Transverse stretching ratio: 1.6:1
Temperature of the film during longitudinal stretching: 125° C.
Longitudinal stretching ratio: 2.1:1
Temperature of the film during embossing: 125° C.
Temperature of the embossing roller: 10° C.
Embossing pressure (linear pressure in the embossing nip): 50 N/cm
Speed of the film on the embossing roller (speed of the embossing roller): 150 m/min
Embossing pattern: a lozenge shaped pattern
Depth to which the pattern is embossed on the roller: 0.18 mm.

The execution of Example 1 is described below in greater detail, based on FIG. 1:

The film 1 coming from the calender is brought to the transverse stretching temperature by means of the roller 2 and then runs onto the two wheels 5 and 6 which are arranged at an angle towards one another (in accordance with German Pat. specification No. 2,024,308), the film being briefly pressed onto the wheels by means of two rubber rollers 3 and 4, as it runs on. After leaving the wheels 5 and 6, the film 1 is passed over the roller 8, against which it is pressed by the rubber roller 7. The roller 8 brings the film 1 up to the longitudinal stretching temperature. The film 1 now runs over the cooled embossing roller 10, against which it is pressed by means of the back-up cylinder 9. Longitudinal stretching is effected on the way from the roller 8 to the pair of rollers 9 and 10. The film 1 is embossed in the nip of the pair of rollers 9 and 10, immediately after the longitudinal stretching. After leaving the embossing roller 10, the stretched and embossed film 1' is cooled to room temperature by means of the rollers 11 and 12 and is rolled up in a winding apparatus (not drawn in the diagram. The stretched and embossed film has a total thickness of 0.055 mm, the depth of embossing in the film is 0.03 mm and the average material thickness of the film is 0.025 mm.

EXAMPLE 2

The starting material used is a rigid polyvinyl chloride film, produced by the high temperature calendering process from a mass homopolymer having a K-value of 60, which is stabilized with a customary organotin stabilizer, is modified, so as to have improved impact strength, with 10% by weight, relative to polyvinyl chloride, of a customary acrylonitrile-butadiene-styrene polymer, and contains a lubricant which is customary for calendering (C wax). The film has a thickness of 0.13 mm.

Summary of the process conditions:
Temperature of the film during transverse stretching: 145° C.
Transverse stretching ratio: 2:1
Temperature of the film during longitudinal stretching: 135° C.
Longitudinal stretching ratio: 1.7:1
Temperature of the film during embossing 135° C.
Temperature of the embossing roller: 20° C.
Embossing pressure (linear pressure in the embossing nip): 70 N/cm
Speed of the film on the embossing roller (speed of the embossing roller): 120 m/min
Embossing pattern: fine linen structure
Depth to which the pattern is embossed on the roller: 0.1 mm.

The execution of Example 2 is described below in greater detail based on FIG. 2:

The film 1 coming from the calender is brought to the transverse stretching temperature by means of the roller 2 and then runs onto the two wheels 5 and 6 which are inclined at an angle towards one another (in accordance with German Pat. specification No. 2,024,308, the film being briefly pressed against the wheels by means of the two rubber rollers 3 and 4, as it runs on. After leaving the wheels 5 and 6, the film 1 is passed over the roller 8, against which it is pressed by the rubber roller 7. The roller 8 brings the film 1 to the longitudinal stretching temperature. The film 1 now runs over the roller 14, against which it is pressed by the rubber roller 13, and over the roller 9, against which it is pressed by the rubber roller 15. The film 1 is longitudinally stretched in a first stage on the way from roller 8 to roller 14 and in a second stage on the way from roller 14 to roller 9. The film 1 is embossed in the nip between rollers 9 and 10 immediately after longitudinal stretching. Roller 9 is the back-up cylinder; roller 10 is the cooled embossing roller. After leaving the embossing roller 10, the stretched and embossed film 1' is brought to room temperature by means of the rollers 11 and 12 and is rolled up in a winding apparatus (not drawn in the diagram). The stretched and embossed film has a total thickness of 0.06 mm, the depth of embossing in the film is 0.025 mm and the average material thickness of the film is 0.035 mm.

EXAMPLE 3

The starting material used is a rigid polyvinyl chloride film, produced by the low temperature calendering process from an emulsion homopolymer having a K-value of 78, which is stabilized with an organotin stabilizer and contains OP wax as lubricant. The film has a thickness of 0.09 mm.

Summary of the process conditions:
Temperature of the film during transverse stretching: 140° C.
Transverse stretching ratio: 1.3:1
Temperature of the film during longitudinal stretching: 135° C.
Longitudinal stretching ratio: 2.1:1
Temperature of the film during embossing: 135° C.
Temperature of the embossing roller: 5° C.
Embossing pressure (linear pressure in the embossing nip): 50 N/cm
Speed of the film on the embossing roller (speed of the embossing roller): 100 m/min
Embossing pattern: shirting pattern
Depth to which the pattern is embossed on the roller: 0.13 mm This example is carried out in a manner based on FIG. 1 and as described in Example 1. The stretched and embossed film has a total thickness of 0.05 mm, the depth of embossing in the film is 0.02 mm and the average material thickness of the film is 0.03 mm.

We claim:

1. A process for the production of biaxially stretched and embossed polyvinyl chloride film which comprises
   (a) biaxially stretching a polyvinyl chloride film at a stretching temperature of 90° to 160° C. at a transverse stretching ratio of 1.2:1 to 2.2:1 and a longitudinal stretching ratio of 1.7:1 to 2.5:1, the product of the transverse and longitudinal stretching ratios not exceeding 3.8:1, and
   (b) immediately after stretching, before the polyvinyl chloride film stretched according to step (a) has cooled appreciably from the stretching temperature range of 90° to 160° C. utilized in step (a), embossing the film by means of an embossing unit comprising an embossing roller back-up cylinder, the temperature of the film as it comes on to the embossing roller being substantially within said stretching temperature range and the embossing roller having a temperature of −10° to +60° C. and the embossing pattern of the embossing roller being embossed into the film to a depth of embossing of 0.02 to 0.25 mm.

2. A process as claimed in claim 1, wherein the biaxial stretching is carried out at a temperature of 110° to 140° C. at a transverse stretching ratio of 1.3:1 to 1.8:1 and a longitudinal stretching ratio of 1.9:1 to 2.3:1, the product of the transverse and longitudinal stretching ratios not exceeding 3.5:1.

3. A process as claimed in claim 1, which comprises
   ($a_1$) stretching the polyvinyl chloride film transversely at a ratio of 1.2:1 to 2.2:1 at a temperature of 90° to 160° C.,
   ($a_2$) after the transverse stretching, stretching the film longitudinally at a ratio of 1.7:1 to 2.5:1 at a temperature of 90° to 160° C., and in so doing
   ($a_3$) not exceeding a value of 3.8:1 for the product of the transverse and longitudinal stretching ratios, and
   (b) immediately after longitudinal stretching, embossing the film by means of an embossing unit, comprising an embossing roller and a back-up cylinder, the film being at a temperature of 90° to 160° C. and the embossing roller being at a temperature of −10° to +60° C. and the embossing pattern of the embossing roller being embossed into the film to a depth of embossing of 0.02 to 0.25 mm.

4. A process as claimed in claim 3, wherein the film is stretched transversely at a ratio of 1.3:1 to 1.8:1 at a temperature of 110° to 140° C., and is stretched longitudinally at a ratio of 1.9:1 to 2.3:1 at a temperature of 110° to 140° C., the product of the transverse and longitudinal stretching ratios not exceeding a value of 3.5:1 and, during the embossing, the film being at a temperature of 110° to 140° C. and the embossing roller being at a temperature of 5° to 30° C. and the depth of embossing being 0.05 to 0.18 mm.

5. A process as claimed in claim 1 wherein the polyvinyl chloride of the polyvinyl chloride film is a homopolymer or copolymer containing at least 50% by weight of polymerized vinyl chloride.

* * * * *